UNITED STATES PATENT OFFICE.

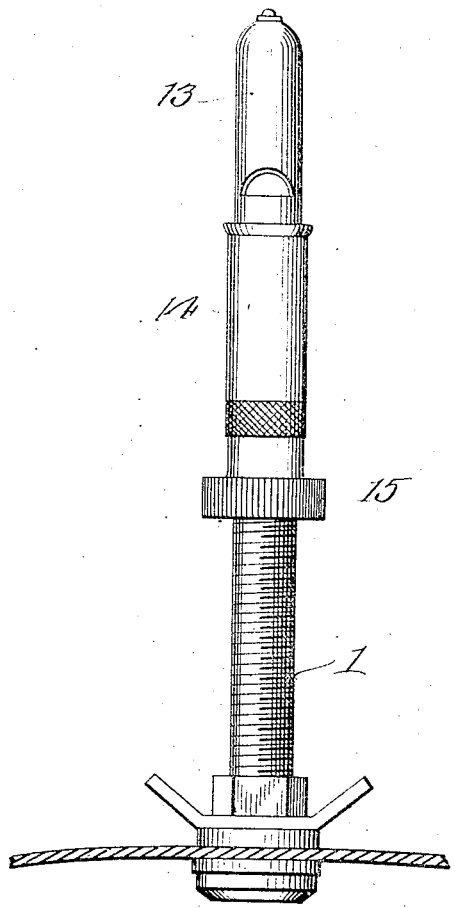
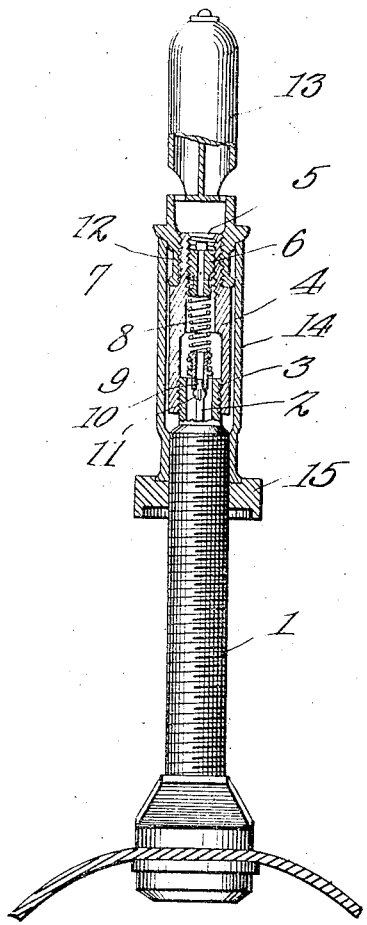

ARCHIE T. JOHNSON, OF EAST LAS VEGAS, NEW MEXICO.

AUTOMATIC TIRE-ALARM.

1,177,630.  Specification of Letters Patent.  Patented Apr. 4, 1916.

Application filed November 24, 1914. Serial No. 873,787.

*To all whom it may concern:*

Be it known that I, ARCHIE T. JOHNSON, a citizen of the United States, residing at East Las Vegas, in the county of San Miguel and State of New Mexico, have invented a new and useful Automatic Tire-Alarm, of which the following is a specification.

The present invention relates to improvements in auto tire alarms, one object of the invention, being the provision of an automatic device adapted to be attached to the valve stem of an inner tube of a pneumatic tire and provided with means to actuate the valve thereof to fully open the same when the pressure has been reduced in the inner tube to a predetermined degree so that the air emitted or released from the tire will actuate an audible alarm, as for instance a whistle, to indicate to the owner that the tire needs replenishing.

A further object of the present invention, is the provision of a simple and inexpensive device of this character which is readily attached and locked in place upon the valve stem of a pneumatic tire and in which all parts are properly clamped against rattling or removal.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the drawings—Figure 1 is a side elevation of a valve stem equipped with the present signal. Fig. 2 is a longitudinal sectional view through the present attachment and the adjacent portion of the valve stem, portions of the whistle also being shown in section.

Referring to the drawings, the numeral 1 designates the usual tubular stem attached to the inner tube of an automobile tire, which is provided with the depressible valve stem 2 accessible through the exteriorly threaded and reduced end 3 of the stem. This structure is such that by depressing the stem 2, the valve (not shown) within the stem 1 will be opened so as to permit of the release of the air within the tire.

Fitting upon the exteriorly threaded end 3 of the stem 1 is a sleeve 4, which in reality is a tubular casing, reduced and interiorly threaded at 5 at the upper end thereof for the reception of the adjustable bushing or member 6, which is provided with the air outlet 7, so that air admitted through the stem 1 will be directed therethrough. Abutting the lower end of the member 6, is a coiled spring 8, the tension of which is adjusted by the adjustability of the member 6, the lower end thereof resting upon member 9 to hold the valve stem engaging the member 9 in position, with its lower socketed end over the extension 10 of the stem 2 and resting against the abutment 11 thereof. Thus it will be seen that by adjusting the member 6, the tension of the spring relative to the member 9 may be adjusted, so that when the pressure within the tire (not shown) is such as to normally hold the valve controlled by the stem 2 closed, the spring 8 will be ineffective. Thus, however, should the pressure within the tire be reduced so that the spring 8 will overcome the spring (not shown) that controls the stem 2, the stem 2 will be depressed and the valve controlled thereby will be opened to permit of the release of the air within the tire, which passes through the casing 4 and the bore 7 to actuate the audible alarm or whistle 13, which is provided with the interiorly screw threaded sleeve 12 for fitting the exterior threaded portion of the upper end of the member 4.

In order to provide a means for locking the whistle 13 in position so that the same will not become loose during the rotation of the wheel, a tubular casing 14 surrounds the casing 4 and threadedly engages at its lower end, the threaded portion of the stem 1, while the upper end engages under the flange portion of the whistle 13, so that the locking member 15 disposed upon the threaded portion of the stem 1 may be adjusted to bear against the lower end thereof and thus lock the parts firmly in position.

From the foregoing description, it is evident that the present device may be easily attached to the inner tube valve stems now in use, by merely displacing the usual cap therefor, the member 6 being adjusted to regulate the tension of the spring so that the valve stem of the inner tube tire will be actuated to open the valve as soon as the tire has leaked and the pressure has been reduced to a predetermined degree. Thus it will be seen that the alarm 13 will be actuated before any damage can be done the tire due to rim cutting and the like where tires are ridden with the pressure reduced to a dangerous degree.

What is claimed is:

A tire alarm comprising a sleeve having one end threaded to engage the end of a tire stem, a whistle threaded upon the other end of the sleeve, an apertured adjusting element threaded within the sleeve, an element to bear against a valve stem, a coiled spring between said elements, and a tubular casing adapted to be threadedly connected at one end to the tire stem and bearing at its other end against the whistle, said tubular casing surrounding said sleeve.

In testimony that I claim the foregoing as my own, I have hereto affixed my signature in the presence of two witnesses.

ARCHIE T. JOHNSON.

Witnesses:
WILLIAM WHALEN,
BENJAMIN LEWIS.